(12) United States Patent
Noda et al.

(10) Patent No.: US 7,046,878 B2
(45) Date of Patent: May 16, 2006

(54) CHANNEL ADD/DROP FILTER AND CHANNEL MONITOR EMPLOYING TWO-DIMENSIONAL PHOTONIC CRYSTAL

(75) Inventors: Susumu Noda, Uji (JP); Yoshihiro Akahane, Itami (JP); Takashi Matsuura, Itami (JP)

(73) Assignees: President, Kyoto University, Kyoto (JP); Sumitomo Electric Industries, Ltd., Osaka (JP)

( * ) Notice: Subject to any disclaimer, the term of this patent is extended or adjusted under 35 U.S.C. 154(b) by 48 days.

(21) Appl. No.: 10/708,525

(22) Filed: Mar. 10, 2004

(65) Prior Publication Data
US 2004/0184735 A1 Sep. 23, 2004

(30) Foreign Application Priority Data
Mar. 17, 2003 (JP) .............................. 2003-071834

(51) Int. Cl.
*G02B 6/27* (2006.01)
(52) U.S. Cl. .......................................... 385/39; 385/11
(58) Field of Classification Search ................... 385/11, 385/24, 27, 37, 39, 129, 130
See application file for complete search history.

(56) References Cited

U.S. PATENT DOCUMENTS

| 5,748,057 A | 5/1998 | De Los Santos |
| 6,175,671 B1 | 1/2001 | Roberts |
| 2002/0009277 A1 | 1/2002 | Noda et al. |

FOREIGN PATENT DOCUMENTS

| EP | 1-136-853 A | 9/2001 |
| JP | 2001-242329 A | 9/2001 |
| JP | 2001-272555 A | 10/2001 |

OTHER PUBLICATIONS

A. Chutinan and S. Noda, "Waveguides and waveguide bends in two-dimensional photonic crystal slabs," Physical Review B, vol. 62, No. 7, 2000, pp. 4488-4492.
S. Noda, et al., "Trapping and emission of photons by a single defect in a photonic bandgap structure," Nature, vol. 407, Oct. 5, 2000, pp. 608-610.
E. Centeno, et al., "Multiplexing and demultiplexing with photonic crystals," Journal of Optics A: Pure Appl. Opt., IOP Publishing, Bristol, GB, vol. 1, No. 5, Sep. 1999, pp. L10-L13.
Masahiro Imada and Susumu Noda, "Recent progress of Semiconductor Photonic Crystals," IEEE-NANO 2002, Aug. 26, 2002, pp. 217-218.

*Primary Examiner*—Sarah Song
(74) *Attorney, Agent, or Firm*—James W. Judge

(57) ABSTRACT

The channel add/drop filter includes first and second 2D photonic crystals, and the first 2D photonic crystal includes a first waveguide and a first cavity, with the first cavity acting to take in light of a specific wavelength from the first waveguide and radiate it outside the first photonic crystal, and the second 2D photonic crystal includes a second waveguide with substantially the same characteristics as the first waveguide and a second cavity with substantially the same characteristics as the first cavity. The first and second waveguides are optically connected so that when the principal plane of the first 2D photonic crystal and the electric-field vector of the light within the first waveguide torn, an arbitrary angle α, the principal plane of the second 2D photonic crystal and the electric-field vector of the light within the second waveguide form an angle of $\alpha+(\pi/2)$.

17 Claims, 3 Drawing Sheets

CHANNEL ADD/DROP FILTER AND CHANNEL MONITOR EMPLOYING TWO-DIMENSIONAL PHOTONIC CRYSTAL

BACKGROUND OF INVENTION

1. Field of the Invention

The present invention relates to channel add/drop filters and channel monitors employing photonic crystals, and in particular to improvements in the adaptability of such channel add/drop filters and channel monitors to polarized waves.

It should be understood that in the present specification, the significance of the term "light" is meant to also include electromagnetic waves that relative to visible light are of longer as well as shorter wavelength.

2. Description of the Background Art

Along with advances in wavelength division multiplexed optical communication systems in recent years, the importance of optical devices such as add/drop filters, channel filters, and channel monitors is on the rise. In addition, miniaturization of these types of optical devices is being sought. If for example a wavelength monitor were to be provided for each of optical amplifiers/transponders in an optical communication system, the wavelength monitor would have to be installed on the optical transponder platform. But because wavelength monitors currently being used are large, installing them on the platforms is physically impossible. Thus owing to the need for miniaturization of optical devices, photonic crystals are being used in attempts to develop extraordinarily small-scale optical devices. In particular, with photonic crystals extremely small-scale optical devices can be realized by exploiting artificial periodic structures in which a crystal-lattice-like periodic, ultra-dense refractive index distribution is artificially imparted within the parent material.

One important feature of photonic crystals is the presence of photonic bandgaps. With photonic crystals having three-dimensional refractive index periodicity (3D photonic crystals), perfect bandgaps in which the transmission of light is prohibited in every direction can be formed. Among the possibilities with these crystals are the local confinement of light, control of spontaneous emission, and formation of waveguides by the introduction of line defects, wherein the realization of ultrasmall photonic integrated circuits is anticipated.

Meanwhile, studies into uses for photonic crystals having a two-dimensional periodic refractive-index structure (2D photonic crystals), are flourishing because the crystals can be manufactured comparatively easily. A periodic refractive-index structure in 2D photonic crystals can be formed by, for example, arranging in a square-lattice or triangular-lattice geometry air rods perforating a high-refractive-index plate material (usually termed a "slab"). Alternatively the structure can be formed within a low-index material by arranging, in a 2D-lattice geometry within it, posts made of a high-refractive-index material. Photonic bandgaps can be produced from such periodic refractive-index structures, enabling the transmission of light traveling in an in-plane direction (direction parallel to both the principal faces of the slab) to be controlled. Waveguides, for instance, may be created by introducing line defects into a periodic refractive-index structure. (See, for example, *Physical Review B*, Vol. 62, 2000, pp. 4488–4492.)

FIG. 5 illustrates, in a schematic oblique view, a channel add/drop filter disclosed in Japanese Unexamined Pat. App. Pub. No. 2001-272555. (In the drawings in the present application, identical reference marks indicate identical or equivalent parts.) The channel add/drop filter in FIG. 5 exploits a 2D photonic crystal having, configured within a slab 1, cylindrical through-holes 2 of identical diameter (ordinarily occupied by air) formed at the vertices of a 2D triangular lattice. In a 2D photonic crystal of this sort, light is prohibited from propagating in an in-plane direction within the slab 1 by a bandgap, and in the direction normal to the plane (direction orthogonal to the two principal faces of the slab) is confined due to total internal reflection occurring at the interface with the low-refractive-index clad (air, for example).

The photonic crystal in FIG. 5 contains a waveguide 3 consisting of a straight line defect. This straight-line defect 3 includes a rectilinearly ranging plurality of lattice points adjoining each other, with the through-holes 2 missing in these lattice points. With light being able to propagate through a defect in a 2D photonic crystal, the straight-line defect can be employed as a linear waveguide. With linear waveguides, the spectrum of wavelengths in which light can be transmitted at low loss is comparatively broad; consequently light in a wide range of wavelength containing signals in a plurality of channels may be propagated through them.

The photonic crystal set out in FIG. 5 also contains a cavity 4 consisting of a point defect. The point defect 4 contains a single lattice point, and through that lattice point a through-hole that is of large diameter as compared with the other lattice points is formed. A defect in this way containing a relatively large-diameter through-hole is generally termed an acceptor-type point defect. On the other hand, a defect in which through-holes are missing in lattice points is generally termed a donor-type point defect. The cavity 4 is disposed adjacent the waveguide 3, within a range in which they can exert on each other an electromagnetically reciprocal effect.

In a 2D photonic crystal such as mat illustrated in FIG. 5, if light 5 containing a plurality of wavelength ranges ($\lambda_1$, $\lambda_2$, ... $\lambda_i$, ...) is introduced into the waveguide 3, light that has the specific wavelength $\lambda_i$ corresponding to the resonant frequency of the cavity 4 is trapped in the cavity and while resonating in the interior of the point defect, light 6 of wavelength $\lambda_i$ is emitted in the plane-normal direction, in which due to the finite thickness of the slab 1 the Q factor is small. This means that the photonic crystal in FIG. 5 can be employed as a channel drop filter. Conversely, by shining light into the point defect 4, in the direction normal to the slab 1, light of wavelength $\lambda_i$ that resonates within the cavity 4 can be introduced into the weveguide 3. This means that the photonic crystal in FIG. 5 can also be employed as a channel add filter. It will be appreciated that the transfer of light between either the waveguide 3 or the cavity 4 and the exterior can be made to take place by proximately disposing an optical fiber or en optoelectronic transducer in the vicinity of the waveguide end faces or the vicinity of the cavity. Of course, in that case a collimating lens (collimator) may be inserted in between either the waveguide end face or the cavity, and the optical-fiber end face or the optoelectronic transducer.

In an optical add/drop filter such as that illustrated in FIG. 5, by appropriately configuring the spacing between the waveguide 3 consisting of the line defect and the cavity 4 consisting of the point defect, the ratio of optical intensities in a specific wavelength that is transferred between the waveguide and the cavity can be controlled. Also in FIG. 5, since no asymmetry is introduced with respect to the point defect 4 in the direction normal to the slab 1, light is output in both vertical directions from the point defect 4; but it is possible to make the output of light be in only one or the other vertical direction by introducing asymmetry in the point defect 4 in the plane-normal direction. An example of a mechanism that can be utilized to introduce this sort of asymmetry is a method in which the diameter of the point defect 4, which is round in section, is made to vary continuously or discontinuously along the thickness of the slab. With further regard to FIG. 5, although the channel add/drop filter in the figure contains only a single cavity, it will be readily understood that by disposing along the waveguide a plurality of cavities differing from one another in resonant wavelength, optical signals in a plurality of channels can be added/dropped. It will be appreciated that the resonant wavelength of the cavity 4 can be changed by, for example, altering the dimensions/shape of the point defect.

The fact that, as described above, a channel add/drop filter such as that depicted in FIG. 5 makes it possible to extract as light 6 light of a specific wavelength $\lambda_i$ only—contained within an optical signal 5—via the cavity 4 means that the filter may be employed in wavelength monitors.

Reference is made to FIG. 6, which schematically illustrates in an oblique view one example of a wavelength monitor employing a 2D photonic crystal such as just discussed. Three cavities 4a, 4b and 4c differing from one another in resonant frequency are provided in this wavelength monitor, and adjacent to these cavities the end faces of optical fibers 10a, 10b and 10c are disposed so as to admit the light of the specific frequencies radiated from the cavities. These optical fibers are in turn connected to photoelectric sensing elements (not illustrated), wherein the specific frequencies of light are detected by the photoelectric sensing elements.

Nevertheless, in a channel add/drop filter employing a 2D photonic crystal such as illustrated in FIG. 5, within the light of the specific wavelength $\lambda_i$ only that portion whose electric-field vector has a component parallel to the principal plane of the 2D photonic crystal 1 can be extracted from the cavity 4 as emitted light 6. On the other hand, the light 5, which is introduced into the waveguide 3 by, for example, an optical fiber, will at times be polarized in a specific direction by the optical fiber or by the impact of the environment leading up to it. For instance, a situation where the electric-field vector of the light of wavelength $\lambda_i$ contained in the introduced light 5 is polarized perpendicular to the principal plane of the 2D photonic crystal 1 will mean that light of wavelength $\lambda_i$ cannot be monitored using the channel add/drop filter of FIG. 5. Likewise too, in a situation where the electric-field vector of the light of wavelength $\lambda_i$ is polarized so as to be inclined with respect to the principal plane of the 2D photonic crystal 1, since within the light only that portion that has an electric-field-vector component parallel to the principal plane of the 2D photonic crystal 1 is what can be monitored within the light of wavelength $\lambda_i$ using the channel add/drop filter of FIG. 5, the proportional intensity of the light of wavelength $\lambda_i$ contained in the introduced light 5 cannot be monitored correctly.

SUMMARY OF INVENTION

A principal object of the present invention, in view of the situation thus with the conventional technology, is in a channel add/drop filter employing 2D photonic crystals to enable extracting light of a specific frequency at the correct relative intensity regardless of the state of polarization of the incident light, and further, to afford a wavelength monitor combining a thus improved channel add/drop filter with photodetectors.

A channel add/drop filter according to one aspect of the present invention includes first and second 2D photonic crystals, and is characterized in that: the first 2D photonic crystal includes a first waveguide made from a line defect and a first cavity made from a point defect, with the first cavity acting to take in light of a specific wavelength from, the first waveguide and radiate it outside the first photonic crystal, as well as conversely to introduce light of the specific wavelength into the first waveguide from outside of the first photonic crystal; the second 2D photonic crystal includes a second waveguide having substantially the same characteristics as the first waveguide, and a second cavity having substantially the same characteristics as the first cavity; and the first and second waveguides are optically connected in series so as to have light in common, and so that when the principal plane of the first 2D photonic crystal and the electric-field vector of the light within The first waveguide form an arbitrary angle $\alpha$, the principal plane of the second 2D photonic crystal and the electric-field vector of the light within the second waveguide form an angle of In this aspect of the invention, the first and second 2D photonic crystals can be disposed so that their principal planes are orthogonal to each other, with the first and second waveguides connected to each other in series either directly, or via a polarization-maintaining fiber. Alternatively, the first and second 2D photonic crystals may be disposed so that their principal planes are parallel to each other, with the first and second waveguides connected to each other in series via a polarization-maintaining fiber and the polarization-maintaining fiber being twisted from the first-waveguide end to the second-waveguide end by $\pi/2$ about the fiber axis. Furthermore, instead of the polarization-maintaining fiber twisted about the fiber axis by $\pi/2$, a Faraday rotator or a half-wave plate may be utilized to rotate by $\pi/2$ the electric-field vector of the light.

A channel add/drop filter according to another aspect of the present invention includes first and second 2D photonic crystals, and is characterized in that: the first 2D photonic crystal includes a first waveguide made from a line defect and a first cavity made from a point defect, with the first cavity acting to take in light of a specific wavelength from the first waveguide and radiate it outside the first photonic crystal, or conversely, to introduce light of a specific wavelength into the first waveguide from an angle of $\alpha+(\pi/2)$. outside of the first photonic crystal; the second 2D photonic crystal includes a second waveguide having substantially the same characteristics as the first waveguide, and a second cavity having substantially the same characteristics as the first cavity; and via a 50/50 optical coupler the first and second waveguides are parallel-connected to a single optical fiber; wherein the first and second waveguides are optically connected with a 50/50 optical coupler so that when the principal plane of the first 2D photonic crystal and the electric-field vector of the light within the first waveguide form an arbitrary angle $\alpha$, the principal plane of the second 2D photonic crystal and the electric-field vector of the light within the second waveguide form an angle $\alpha+(\pi/2)$.

In this aspect of the invention, the first and second 2D photonic crystals can be disposed so that their principal planes are orthogonal to each other, with the first and second waveguides parallel-connected either via respectively corresponding first and second polarization-maintaining fibers, or directly, to the 50/50 optical coupler. Alternatively, the first and second 2D photonic crystals may be disposed so that their principal planes are parallel to each other, with the first waveguide connected to the 50/50 optical coupler either directly or via a first polarization-maintaining fiber and the second waveguide connected to the 50/50 optical coupler via a second polarization-maintaining fiber, and then with the second polarization-maintaining fiber being twisted from the optical-coupler end to the second-waveguide end by π/2 about the fiber axis. Furthermore, instead of the second polarization-maintaining fiber twisted about the fiber axis by π/2, a Faraday rotator or a half-wave plate may be utilized to rotate by π/2 the electric-field vector of the light.

In addition, in the above-described channel add/drop filter the first 2D photonic crystal can include a plurality of cavities that differ from one another in resonant frequency, while the second 2D photonic crystal can include a plurality of cavities with substantially the same characteristics as those of the cavities in the first 2D photonic crystal.

Further still, a wavelength monitor can be produced by furnishing in a channel add/drop filter such as described above photodetectors that either directly or via optical fibers detect light radiated from the cavities.

From the following detailed description in conjunction with the accompanying drawings, the foregoing and other objects, features, aspects and advantages of the present invention will become readily apparent to those skilled in the art.

DETAILED DESCRIPTION

EMBODIMENT 1

Figure 1:
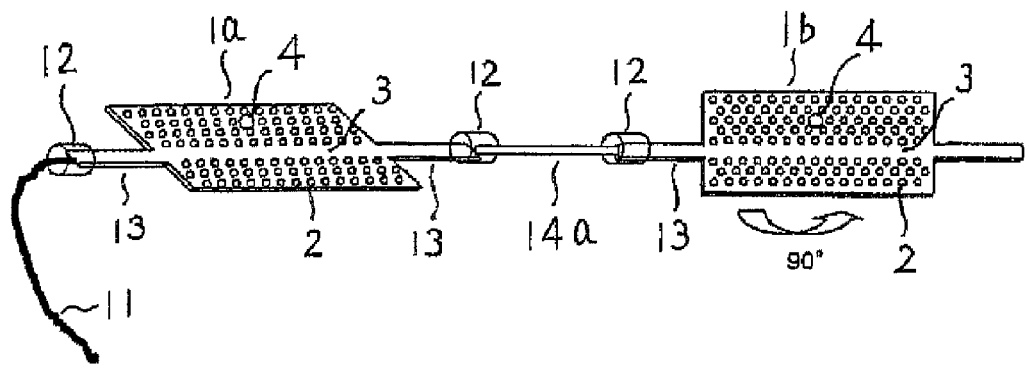
FIG. 1 is a schematic oblique view illustrating a channel add/drop filter employing 2D photonic crystals, in one example of an embodiment of the present invention.
Figure 5:
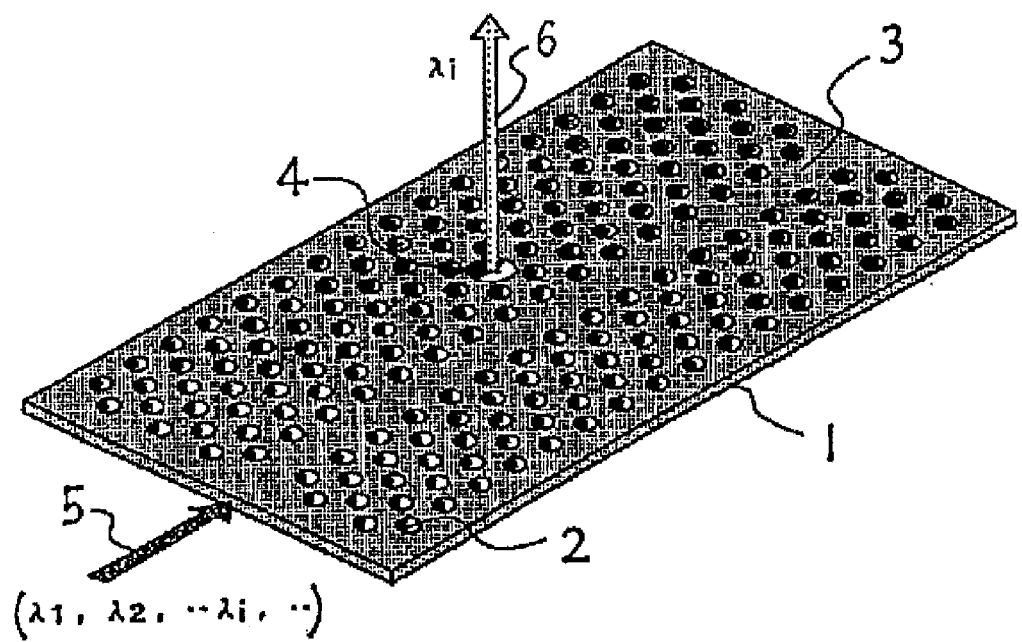
FIG. 5 is a schematic oblique view illustrating an example according to the prior art of a channel add/drop filter employing a 2D photonic crystal.

Reference is made to FIG. 1, schematically illustrating in an oblique view a channel add/drop filter employing 2D photonic crystals, according to Embodiment 1 of the present invention. The channel add/drop filter includes a first 2D photonic crystal 1a and a second 2D photonic crystal 1b. These 2D photonic crystals contain through-holes 2, waveguides 3, and cavities 4, likewise as in the FIG. 5 case. Accordingly, the waveguides 3 and cavities 4 contained in the two 2D photonic crystals 1a and 1b have wave-guiding characteristics and resonant characteristics that are identical to each other.

A signal beam is introduced into the waveguide 3 in the first 2D photonic crystal 1a from an optical fiber 11 via, preferably, a spot-size converter 12 and a microstrip waveguide 13. Within light of a specific wavelength $\lambda_i$ contained in the light incident into the waveguide 3 in the first 2D photonic crystal 1a, the light portion having an electric-field vector component parallel to the principal plane of the first 2D photonic crystal 1a is trapped in its cavity 4, from where it is emitted.

The remaining light, which was not captured in the cavity 4 in the first 2D photonic crystal 1a, is introduced into the waveguide 3 in the second 2D photonic crystal 1b either directly or by means of a polarization-maintaining fiber 14a. This means that the first and second 2D photonic crystals 1a and 1b are connected to each other in series. In this case as well, it is preferable that a spot-size converter 12 and a microstrip waveguide 13 be interpolated in between the polarization-maintaining fiber 14a, and the 2D photonic crystals 1a and 1b. What is to be stressed herein is that the principal planes of the first and second 2D photonic crystals 1a and 1b are disposed so as to be in a mutually orthogonal relationship.

Of the light of the specific wavelength $\lambda_i$ within the light introduced into the waveguide 3 in the second 2D photonic crystal 1b, the portion having an electric-field vector component orthogonal to the principal plane of the first 2D photonic crystal 1a remains. In this situation, inasmuch as the principal planes of the first and second 2D photonic crystals 1a and 1b are in a mutually orthogonal relationship, the electric-field vector component orthogonal to the principal plane of the first 2D photonic crystal 1a is parallel to the principal plane of the second 2D photonic crystal 1b. Of the light of specific wavelength $\lambda_i$, the portion having an electric-field vector component parallel to the principal plane of the second 2D photonic crystal 1b is thus trapped in the cavity 4 in the second 2D photonic crystal 1b, from where it is emitted.

This means that a first light portion of specific wavelength $\lambda_i$, emitted from the cavity 4 in the first 2D photonic crystal 1a, and a second light portion of the specific wavelength $\lambda_i$, emitted from the cavity 4 in the second 2D photonic crystal 1b, have electric-field vectors that are orthogonal to each other. Then by detecting with photodetectors and compounding the intensities of these first and second light portions, the proportional intensity of the light of the specific wavelength $\lambda_i$ within the introduced signal light can be monitored accurately regardless of whether the light of the specific wavelength $\lambda_i$ is polarized or not.

EMBODIMENT 2

Figure 2:
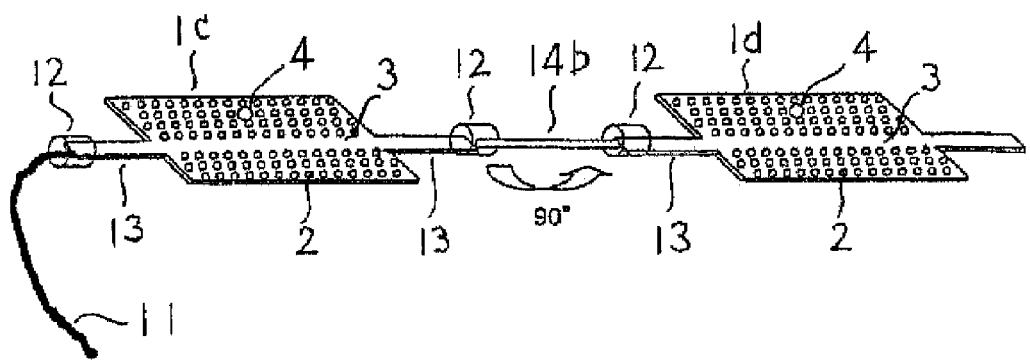
FIG. 2 is a schematic oblique view illustrating a channel add/drop filter employing 2D photonic crystals, in another example of an embodiment of the present invention.

Reference is made to FIG. 2, schematically illustrating in an oblique view a channel add/drop filter employing 2D photonic crystals, according to Embodiment 2 of the present invention. In the channel add/drop filter of Embodiment 2 also, similarly to Embodiment 1, a first 2D photonic crystal 1c and a second 2D photonic crystal 1d are connected to each other in series via a polarization-maintaining fiber 14b. Waveguides and cavities contained in these two 2D photonic crystals thus have wave-guiding characteristics and resonant characteristics that are identical to each other.

Embodiment 2 of FIG. 2, however, differs from Embodiment 1 of FIG. 1 in that the principal planes of the first and second 2D photonic crystals 1c and 1d are disposed so as to be in a mutually parallel relationship, and in that the polarization-maintaining fiber 14b is twisted about the fiber axis by π/2 from the first 2D photonic crystal 1c end to the second 2D photonic crystal 1d end.

In Embodiment 2 thus, within light of a specific wavelength $\lambda_i$ contained in the light incident into the waveguide 3 in the first 2D photonic crystal 1c, the light portion having an electric-field vector component parallel to the principal plane of the first 2D photonic crystal 1c is trapped in its cavity 4, from where it is emitted.

The remaining light, which was not captured in the cavity 4 in the first 2D photonic crystal 1c, is introduced into the polarization-maintaining fiber 14b. Of the light of the specific wavelength $\lambda_i$ within the light introduced into the polarization-maintaining fiber 14b, the portion having an electric-field vector component orthogonal to the principal plane of the first 2D photonic crystal 1c remains. In this situation, inasmuch as the polarization-maintaining fiber 14b is twisted by $\pi/2$ from the first 2D photonic crystal 1c end to the second 2D photonic crystal 1d end, in turn the electric-field vector component of the light portion of the specific wavelength $\lambda_i$ is also rotated by $\pi/2$ and is introduced into the waveguide 3 in the second 2D photonic crystal 1d.

This means that the light portion of the specific wavelength $\lambda_i$, which had had the electric-field vector component orthogonal with respect to the principal plane of the first 2D photonic crystal 1c, within the second 2D photonic crystal 1d becomes parallel to its principal plane. The light portion of the specific wavelength $\lambda_i$ having the electric-field vector component parallel to the principal plane of the second 2D photonic crystal 1d thus is trapped in the cavity 4 in the second 2D photonic crystal 1d, from where it is emitted Accordingly, a first light portion of specific wavelength $\lambda_i$, omitted from the cavity 4 in the first 2D photonic crystal 1c, and a second light portion of the specific wavelength $\lambda_i$, emitted from the cavity 4 in the second 2D photonic crystal 1d, are light portions that had had electric-field vectors in essence orthogonal to each other. Consequently, by detecting with photodetectors and compounding the intensities of these first and second light portions, the proportional intensity of the light of the specific wavelength $\lambda_i$ within the introduced signal light can be monitored accurately regardless of whether the light of the specific wavelength $\lambda_i$ is polarized or not.

EMBODIMENT 3

Figure 3:
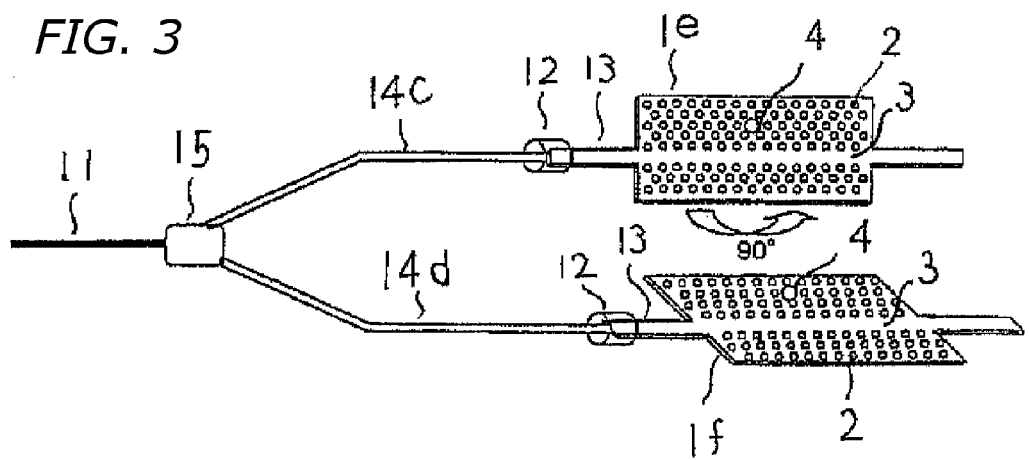
FIG. 3 is a schematic oblique view illustrating a channel add/drop filter employing 2D photonic crystals, in yet another example of an embodiment of the present invention.

Reference is made to FIG. 3, schematically illustrating in an oblique view a channel add/drop filter employing 2D photonic crystals, according to Embodiment 3 of the present invention. This channel add/drop filter includes first and second 2D photonic crystals 1e and 1f connected in parallel with respect to a single optical fiber 11 via a 50/50 optical coupler 15 and first and second polarization-maintaining fibers 14c and 14d. These 2D photonic crystals contain through-holes 2, waveguides 3, and cavities 4, likewise as in the FIG. 5 case. Accordingly, the waveguides and cavities contained in the two 2D photonic crystals and have wave-guiding characteristics and resonant characteristics that are identical to each other.

An optical signal having been split equally by the optical coupler 15 and conducted into the first polarization-maintaining fiber 14c is introduced into the waveguide 3 in the first 2D photonic crystal 1e via, preferably, a spot-size converter 12 and a microstrip waveguide 13. Within light of a specific wavelength $\square_i$ contained in the light incident into the waveguide 3 in the first 2D photonic crystal 1e, the light portion having an electric-field vector component parallel to the principal plane of the first 2D photonic crystal 1e is trapped in its cavity 4, from where it is emitted.

An optical signal having been split equally by the optical coupler 15 and conducted into the first polarization-maintaining fiber 14c is introduced into the waveguide 3 in the first 2D photonic crystal 1e via, preferably, a spot-size converter 12 and a microstrip waveguide 13. Within light of a specific wavelength $\lambda_i$ contained in the light incident into the waveguide 3 in the first 2D photonic crystal 1e, the light portion having an electric-field vector component parallel to the principal plane of the first 2D photonic crystal 1e is trapped in its cavity 4, from where it is emitted.

In a similar fashion, the optical signal having been split equally by the optical coupler 15 and conducted into the second polarization-maintaining fiber 14d is introduced into the waveguide 3 in the second 2D photonic crystal 1f via, preferably, a spot-size converter 12 and a microstrip waveguide 13. Within light of a specific wavelength $\lambda_i$ contained in the light incident into the waveguide 3 in the second 2D photonlc crystal 1f, the light portion having an electric-field vector component parallel to the principal plane of the second 2D photonic crystal 1f is trapped in its cavity 4, from where it is emitted.

What is to be emphasized herein is that the principal planes of the first and second 2D photonic crystals 1a and 1f are disposed so as to be in a mutually orthogonal relationship. This means that a first light portion of specific wavelength $\lambda_i$, emitted from the cavity 4 in the first 2D photonic crystal 1e, and a second light portion of the specific wavelength $\lambda_i$, emitted from the cavity 4 in the second 2D photonic crystal 1f, have electric-field vectors that are orthogonal to each other. Accordingly, by detecting with photodetectors and compounding the intensities of these first and second light portions, the proportional intensity of the light of the specific wavelength $\lambda_i$ within the introduced signal light can be monitored accurately regardless of whether the light of the specific wavelength $\lambda_i$ is polarized or not. It should be understood that the first and second 2D photonic crystals 1e and 1f may be connected directly to the 50/50 optical coupler 15, without the polarization-maintaining fibers 14c and 14d intervening.

EMBODIMENT 4

Figure 4:
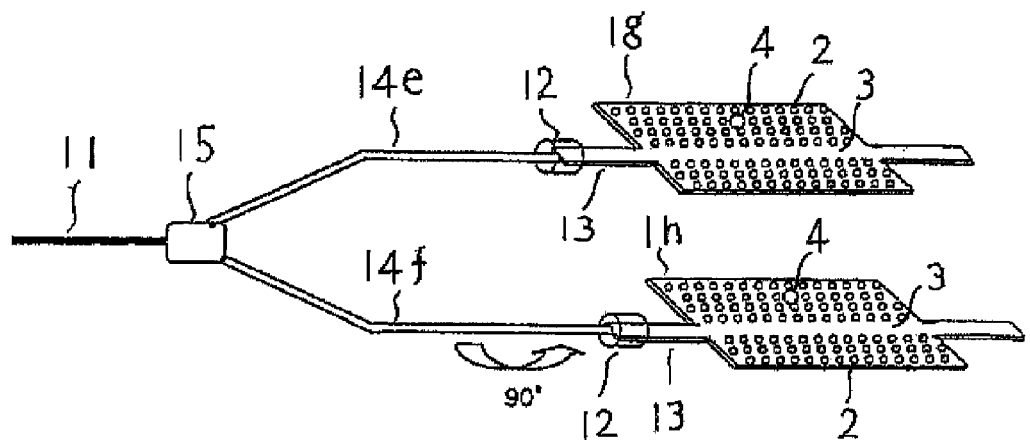
FIG. 4 is a schematic oblique view illustrating a channel add/drop filter employing 2D photonic crystals, in still another example of an embodiment of the present invention.

Reference is made to FIG. 4, schematically illustrating in an oblique view a channel add/drop filter employing 2D photonic crystals, according to Embodiment 4 of the present invention. In the channel add/drop filter of Embodiment 4 also, similarly to Embodiment 3, first and second 2D photonic crystals 1g and 1h are connected in parallel with respect to a single optical fiber 11 via a 50/50 optical coupler 15 and first and second polarization-maintaining fibers 14e and 14f. Waveguides 3 and cavities 4 contained in these two 2D photonic crystals thus have wave-guiding characteristics and resonant characteristics that are identical to each other.

Embodiment 4 of FIG. 4, however, differs from Embodiment 3 of FIG. 3 in that the principal planes of the first and second 2D photonic crystals 1g and 1h are disposed so as to be in a mutually parallel relationship, and in that the second polarization-maintaining fiber 14f is twisted about the fiber axis by $\pi/2$ from the optical coupler 15 end to the second 2D photonic crystal 1h end.

An optical signal having been split equally by the optical coupler 15 and conducted into the first polarization-maintaining fiber 14e is introduced into the waveguide 3 in the first 2D photonic crystal 1g. Within light of a specific wavelength $\lambda_i$ contained in the light incident into the waveguide 3 in the first 2D photonic crystal 1g, the light portion having an electric-field vector component parallel to the principal plane of the first 2D photonic crystal 1g is trapped in its cavity 4, from where it is emitted. In the same manner, the optical signal having been split equally by the optical coupler 15 and conducted into the second polarization-maintaining fiber 14f is introduced into the waveguide 3 in the second 2D photonic crystal 1h. Within light of a specific wavelength $\lambda_i$ contained in the light incident into the waveguide 3 in the second 2D photonic crystal 1h, the light portion having an electric-field vector component parallel to the principal plane of the second 2D photonic crystal 1h is trapped in its cavity 4, from where it is emitted.

What is to be emphasized herein is that the principal lanes of the first and second 2D photonic crystals 1g and 1h are disposed so as to be in a mutually parallel relationship, while the second polarization-maintaining fiber 14f is twisted about the fiber axis by π/2 from the optical coupler 15 end to the second 2D photonic crystal 1h end.

This means that a first light portion of specific wavelength $\lambda_i$, emitted from the cavity 4 in the first 2D photonic crystal 1g, and a second light portion of the specific wavelength $\lambda_i$, emitted from the cavity 4 in the second 2D photonic crystal 1h, are light portions that had had electric-field vectors in essence orthogonal to each other. Accordingly, by detecting with photodetectors and compounding the intensities of these first and second light portions, the proportional intensity of the light of the specific wavelength $\lambda_i$ within the introduced signal light can be monitored accurately regardless of whether the light of the specific wavelength $\lambda_i$ is polarized or not. It should be understood that the first 2D photonic crystal 1g maybe connected directly to the 50/50 optical coupler 15, without the first polarization-maintaining fiber 14e intervening.

Turning now to the above-described embodiments considered together, instead of the polarization-maintaining fiber in those embodiments where it is twisted by π/2 about the fiber axis, a Faraday rotator or a half-wave plate can be utilized equivalently to rotate by π/2 the electric-field vector of the light, as will be readily apparent to those skilled in the art. In that case, the above-described first and second 2D photonic crystals can be formed sandwiching the Faraday rotator or the half-wave plate, as a single-chip optical component.

Figure 6:
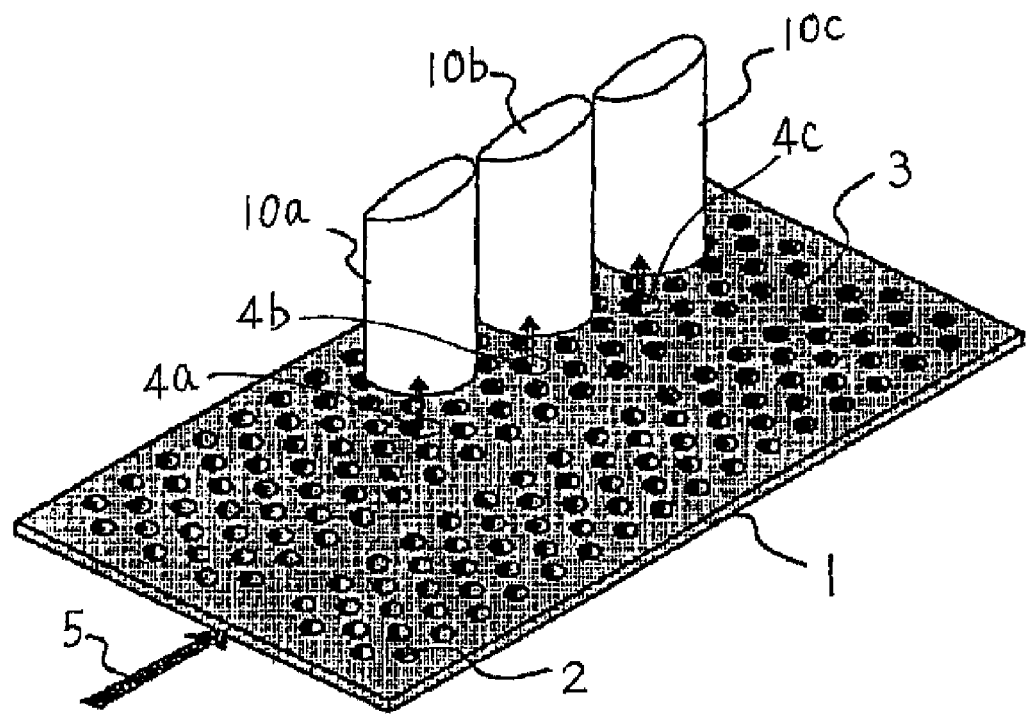
FIG. 6 is a schematic plan view illustrating another example according to the prior art of a channel add/drop filter employing a 2D photonic crystal.

In the foregoing embodiments, in a single 2D photonic crystal only a single cavity is arranged proximate to a single waveguide, but as illustrated in FIG. 6, by adjacently arranging along a single waveguide within a single 2D photonic crystal a plurality of cavities 4 that differ from one another in resonant frequency, a multi-channel add/drop filter capable of handling optical signals in a plurality of channels differing from each other in wavelength can be created, as will be readily apparent to those skilled in the art.

In addition, by disposing the end face of an optical fiber to confront each cavity 4 proximately, the light emitted from the cavity 4 in the direction normal to the slab 1 can be introduced into the optical fiber, and conversely, a beam can be injected into the cavity from the optical fiber. Furthermore, by disposing an optoelectronic transducer to confront the cavity 4 proximately, the wavelength of the light from the cavity can be monitored, or its intensity modulations received. It will be readily understood by those skilled in the art that a collimating lens (collimator) may be inserted in between the cavity 4 and either the optical-fiber end face or the optoelectronic transducer.

As given in the foregoing the present invention makes possible in a channel add/drop filter employing 2D photonic crystals the extraction of light of a specific frequency at the correct relative intensity regardless of the state of polarization of the incident light, and affords a wavelength monitor combining a thus improved channel add/drop filter with photodetectors.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A channel add/drop filter comprising:
    a first 2D photonic crystal including a first waveguide made from a line defect and a first cavity made from a point defect, said first cavity acting to take in light of a specific wavelength from said first waveguide and radiate it outside said first photonic crystal and conversely acting to introduce light of a specific wavelength into said first waveguide from outside of said first photonic crystal;
    a second 2D photonic crystal including a second waveguide having substantially the same characteristics as said first waveguide, and a second cavity having substantially the same characteristics as said first cavity; and
    means for optically connecting said first and second waveguides in series so as to have light in common, and so that when the principal plane of said first 2D photonic crystal and the electric-field vector of the light within said first waveguide form an arbitrary angle α, the principal plane of said second 2D photonic crystal and the electric-field vector of the light within said second waveguide form an angle of α+(π/2).

2. A channel add/drop filter as set forth in claim 1, wherein:
    said first and second 2D photonic crystals are disposed so that their principal planes are orthogonal to each other; and
    said first and second waveguides are connected to each other directly in series.

3. A channel add/drop filter as set forth in claim 1, wherein:
    said first and second 2D photonic crystals are disposed so that their principal planes are orthogonal to each other; and
    said first and second waveguides are connected to each other in series via a polarization-maintaining fiber.

4. A channel add/drop filter as set forth in claim 1, wherein:
    the first and second 2D photonic crystals are disposed so that their principal planes are parallel to each other; and
    the first and second waveguides are connected to each other in series via a polarization-maintaining fiber, the polarization-maintaining fiber being twisted from the first-waveguide end to the second-waveguide end by π/2 about the fiber axis.

5. A channel add/drop filter as set forth in claim 1, wherein:
    the first and second 2D photonic crystals are disposed so that their principal planes are parallel to each other; and
    the first and second waveguides are connected to each other in series via a Faraday rotator for rotating by π/2 the electric-field vector of the light.

6. A channel add/drop filter as set forth in claim 1, wherein:
    the first and second 2D photonic crystals are disposed so that their principal planes are parallel to each other; and
    the first and second waveguides are connected to each other in series via a half-wave plate for rotating by π/2 the electric-field vector of the light.

7. A channel add/drop filter as set forth in claim 1, wherein:
said first 2D photonic crystal contains a plurality of cavities differing from one another in resonant frequency; and
said second 2D photonic crystal contains a plurality of cavities having substantially the same characteristics as those of the cavities in said first 2D photonic crystal.

8. A wavelenght monitor comprising a channel add/drop filter as set forth in claim 1; and a photodetector for either directly or via optical fibers detecting light radiated from the cavities.

9. A channel add/drop filter comprising:
a first 2D photonic crystal including a first waveguide made from a line defect and a first cavity made from a point defect, said first cavity acting to take in light of a specific wavelength from said first waveguide and radiate it outside said first photonic crystal and conversely acting to introduce light of a specific wavelength into said first waveguide from outside of said first photonic crystal;
a second 2D photonic crystal including a second waveguide having substantially the same characteristics as said first waveguide, and a second cavity having substantially the same characteristics as said first cavity; and
a 50/50 optical coupler optically parallel-connecting said first and second waveguides to a single optical fiber, said coupler connecting said first and second waveguides so that when the principal plane of said first 2D photonic crystal and the electric-field vector of the light within said first waveguide form an arbitrary angle $\alpha$, principal plane of said second 2D photonic crystal and the electric-field vector of the light within said second waveguide form an angle of $\alpha+(\pi/2)$.

10. A channel add/drop filter as set forth in claim 9, wherein:
said first and second 2D photonic crystals are disposed so that their principal planes are orthogonal to each other; and
said first and second waveguides are parallel-connected via respectively corresponding first and second polarization-maintaining fibers to the 50/50 optical coupler.

11. A channel add/drop filter as set forth in claim 9, wherein:
said first and second 2D photonic crystals are disposed so that their principal planes are orthogonal to each other; and
said first and second waveguides are parallel-connected directly to the 50/50 optical coupler.

12. A channel add/drop filter as set forth in claim 9, wherein:
said first and second 2D photonic crystals are disposed so that their principal planes are parallel to each other;
said first waveguide is connected to said 50/50 optical coupler via a first polarization-maintaining fiber;
said second waveguide is connected to the 50/50 optical coupler via a second polarization-maintaining fiber; and
said second polarization-maintaining fiber is twisted from the optical-coupler end to the second-waveguide end by $\pi/2$ about the fiber axis.

13. A channel add/drop filter as set forth in claim 9, wherein:
said first and second 2D photonic crystals are disposed so that their principal planes are parallel to each other;
said first waveguide is connected to said 50/50 optical coupler directly;
said second waveguide is connected to the 50/50 optical coupler via a polarization-maintaining fiber; and
said polarization-maintaining fiber is twisted from the optical-coupler end to the second-waveguide end by $\pi/2$ about the fiber axis.

14. A channel add/drop filter as set forth in claim 9, wherein:
said first and second 2D photonic crystals are disposed so that their principal planes are parallel to each other;
said first and second waveguides are parallel-connected via respectively corresponding first and second polarization-maintaining fibers to the 50/50 optical coupler; and
a Faraday rotator or a half-wave plate is inserted in the interval from the optical-coupler end to the second-waveguide end for rotating by $\pi/2$ the electric-field vector of the light.

15. A channel add/drop filter as set forth in claim 9, wherein:
said first and second 2D photonic crystals are disposed so that their principal planes are parallel to each other;
said first and second waveguides are parallel-connected directly to the 50/50 optical coupler; and
a Faraday rotator or a half-wave plate is inserted in the interval from the optical-coupler end to the second-waveguide end for rotating by $\pi/2$ the electric-field vector of the light.

16. A channel add/drop filter as set forth in claim 9, wherein:
said first 2D photonic crystal contains a plurality of cavities differing from one another in resonant frequency; and
said second 2D photonic crystal contains a plurality of cavities having substantially the same characteristics as those of the cavities in said first 2D photonic crystal.

17. A wavelength monitor comprising a channel add/drop filter as set forth in claim 9, and a photodetector for either directly or via optical fibers detecting light radiated from the cavities.

* * * * *